UNITED STATES PATENT OFFICE.

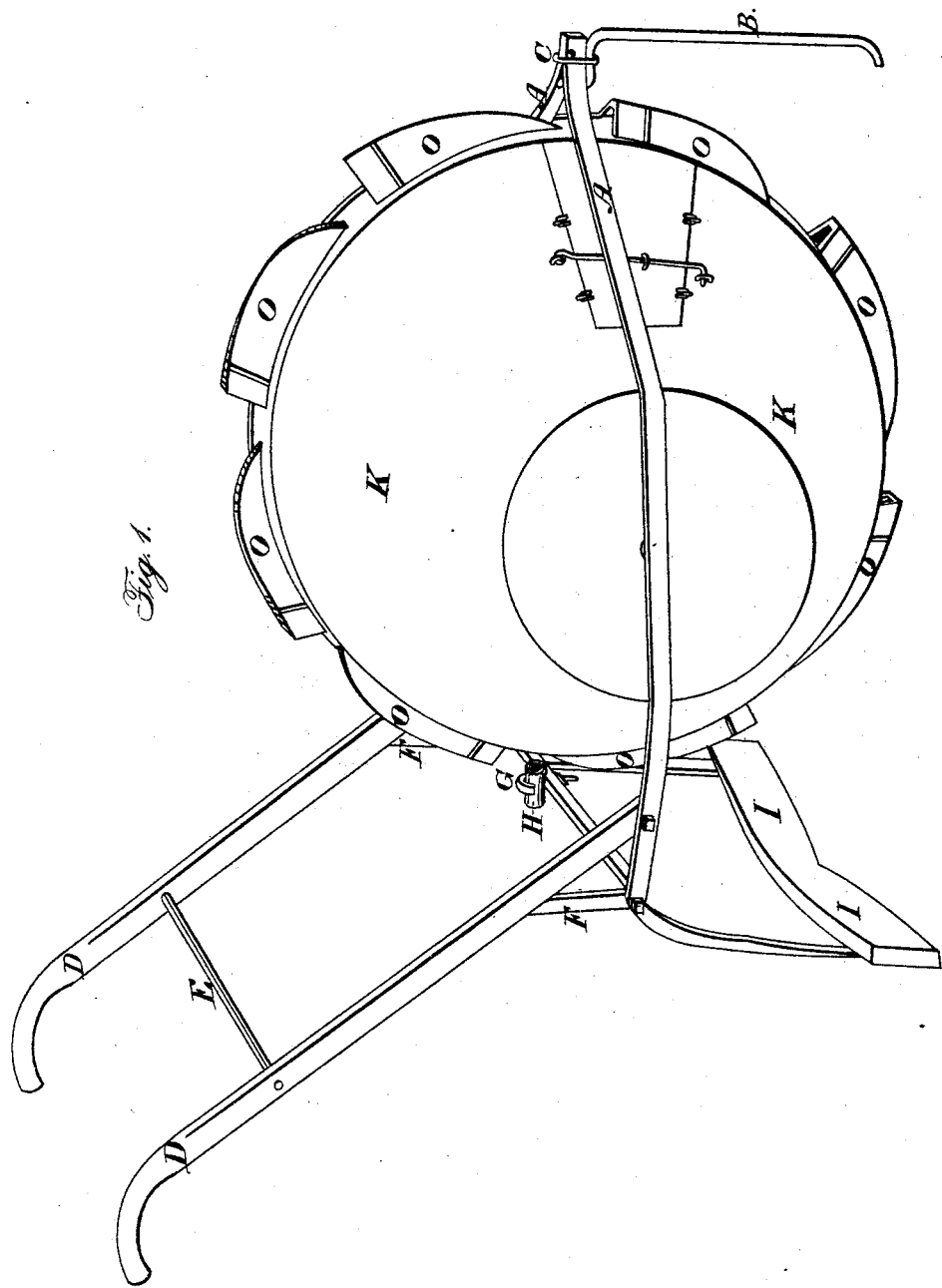

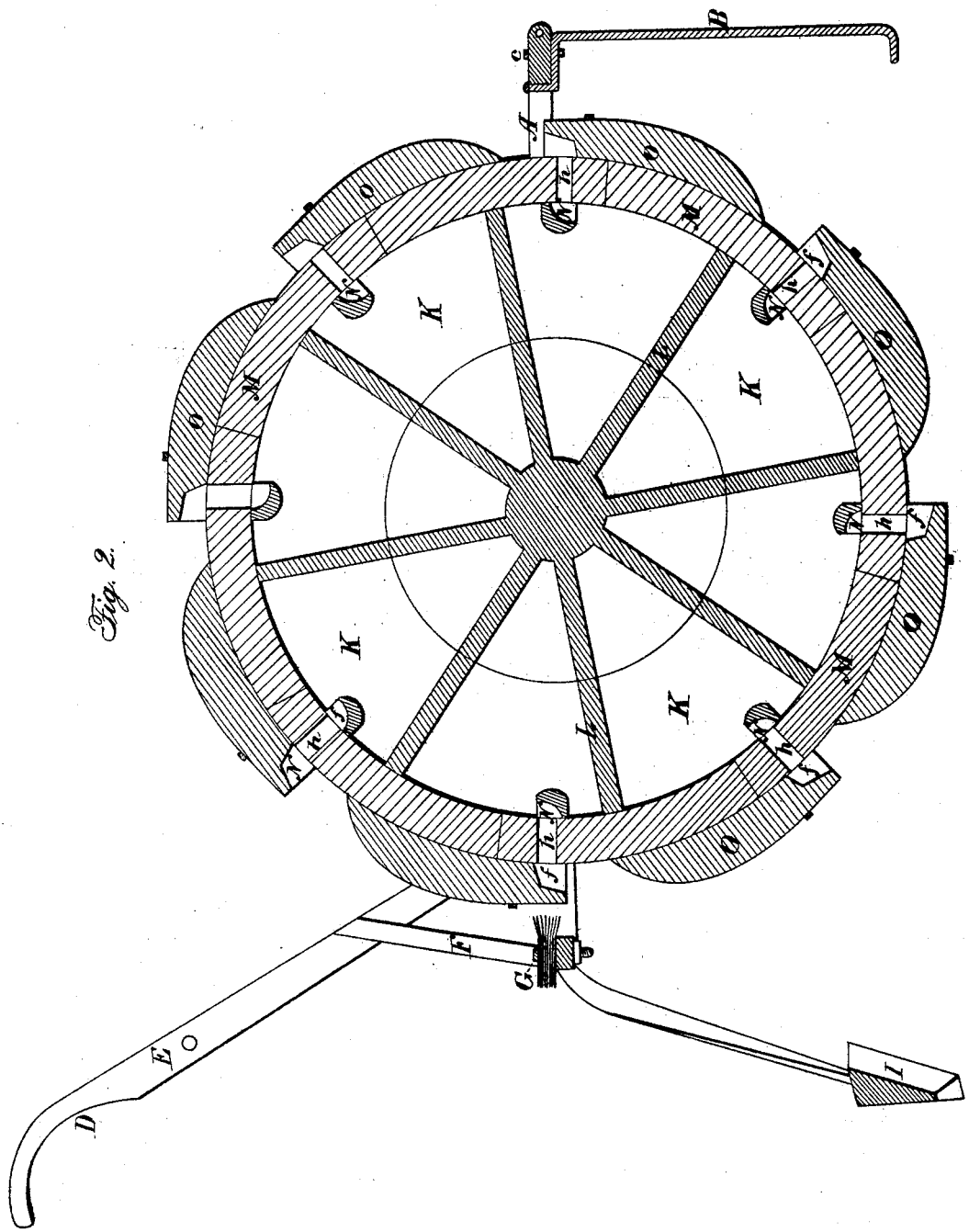

J. S. HUGGINS AND R. CHAPMAN, OF TIMMONSVILLE, SOUTH CAROLINA.

IMPROVEMENT IN COTTON-SEED PLANTERS.

Specification forming part of Letters Patent No. 20,432, dated June 1, 1858.

*To all whom it may concern:*

Be it known that we, JOHN S. HUGGINS and ROWLAND CHAPMAN, of Timmonsville, district of Darlington, in the State of South Carolina, have invented a new and useful Machine for Planting Cotton-Seed, Peas, &c.; and we do hereby declare that the following is a full, clear, and exact description of the construction and operation of the same, reference being had to the annexed drawings, making a part of this specification, in which—

Figure 1 is a perspective view of the machine, and Fig. 2 is a longitudinal vertical section of the same.

The nature of our invention consists in the hereinafter-described combination of devices for planting cotton and other seed.

To enable others skilled in the art to make and use our invention, we will proceed to describe its construction and operation.

In the drawings, A is the frame; B, the opener attached to the frame for the purpose of opening a trench in the beds when they are hard; C, the ring by which the opener is fastened to the frame, so that it may be put on or taken off, as desired; D, the handles, which are attached to the frame by means of a bolt and braces fastened on the cross-piece of the frame and to the handles; G, the hook, fastened in the cross-piece of the frame, with a hand-screw to hold a brush for the purpose of brushing the dirt off the fenders; H, the brush; I, the coverer, which is fastened to the frame with bolts or screws; K, the hollow revolving cylinder, attached to the frame by means of gudgeons driven in the ends of the axle and going into holes made in the sides of the frame; L, the spokes, eight in number, driven in the axle; M, the fellies, which are fastened on the ends of the spokes; N, the receivers, fastened in the fellies on the inside, to receive the desired quantity of seed as the cylinder revolves; O, the fenders, attached to the face of the fellies on the outside with a staple and screw, to prevent the holes in the fellies for the seed or peas to pass through from stopping with dirt, and to make a trench in the bed by perforation when the beds are soft, to receive the seed when they fall out of the hollow F, made in one end of the fenders, and placed over the hole in the felly through which the seed or peas pass to said hollow; P, the double door in the side of the cylinder, fastening on each side with wire staple-hinges, and a stay of wire fastened on one side with a wire staple, and reaching or extending across the shutters and hooked in a staple.

The operation of our new cotton-seed and pea planter is as follows: The seed being well rubbed, a proper quantity must be put in the cylinder. It may be filled half-full. Then, as the cylinder is revolving, the mouths of the receivers, being always upon the back part of the cylinder, catch the seed. The receivers may be made so as to catch any desired quantity, so as to plant thick or thin, which passes through the hole in the fellies to the hollow in the end of the fenders, and falls from the fenders, as it rises from the ground, into the trench, covering in length generally a space in the trench from two to four inches, thus making it very convenient to thin to a proper stand either with the hoe or by hand. If the horse walks fast, it plants equally well and strews the seed a little more in the trench. If the beds are soft, the fender will make a trench sufficiently deep; but if the beds are hard, in there is an opener attached to the frame front by means of a ring, to open a trench, which can be put on or taken off very handily. The brush fastened to the frame behind the cylinder is to keep the dirt brushed off of the fenders. As it will be necessary to use the brush only on sticky land, it is fastened with a hook and hand-screw, so as to be made to brush the fenders or not to touch them. The frame is so constructed as to make it very easy to manage in planting, and may be run to the edge of the trees or stumps without difficulty. The coverer being attached to the frame, and stationary, makes it easy to cover the seed properly in light or stiff land.

We claim—

The arrangement of the frame A and its furrow-opener B, ring C, handles D, braces F, hook G, brush H, and coverer I, with the cylinder K and its receivers N, discharge-aperture $h$, cavity $f$, and fender O, the whole being constructed for operation conjointly, in the manner and for the purpose herein set forth.

JOHN S. HUGGINS.
ROWLAND CHAPMAN.

Witnesses:
JAMES H. M. HUGGINS,
JOHN D. HUGGINS.